(12) United States Patent
Del Fabro

(10) Patent No.: US 12,151,278 B2
(45) Date of Patent: Nov. 26, 2024

(54) APPARATUS AND METHOD FOR COLLECTING OBLONG PRODUCTS

(71) Applicant: M.E.P. MACCHINE ELETTRONICHE PIEGATRICI S.P.A., Reana Del Rojale (IT)

(72) Inventor: Giorgio Del Fabro, Udine (IT)

(73) Assignee: M.E.P. MACCHINE ELETTRONICHE PIEGATRICI S.P.A., Reana del Rojale (IT)

( * ) Notice: Subject to any disclaimer, the term of this patent is extended or adjusted under 35 U.S.C. 154(b) by 49 days.

(21) Appl. No.: 18/008,795

(22) PCT Filed: Jun. 15, 2021

(86) PCT No.: PCT/IT2021/050185
§ 371 (c)(1),
(2) Date: Dec. 7, 2022

(87) PCT Pub. No.: WO2021/255768
PCT Pub. Date: Dec. 23, 2021

(65) Prior Publication Data
US 2023/0219128 A1    Jul. 13, 2023

(30) Foreign Application Priority Data
Jun. 16, 2020 (IT) .................. 102020000014254

(51) Int. Cl.
*B21D 43/00* (2006.01)
*B21D 11/15* (2006.01)
*B21D 43/13* (2006.01)

(52) U.S. Cl.
CPC ............ *B21D 43/006* (2013.01); *B21D 11/15* (2013.01); *B21D 43/13* (2013.01); *B65G 2201/0217* (2013.01)

(58) Field of Classification Search
CPC ...... B21D 43/006; B21D 11/15; B21D 43/13; B65G 2201/0217
USPC ....................................................... 414/745.1
See application file for complete search history.

(56) References Cited

U.S. PATENT DOCUMENTS 9,950,879 B2 * 4/2018 Toncelli ................. B65G 57/04
2015/0136568 A1 5/2015 Matsumoto

FOREIGN PATENT DOCUMENTS

| CN | 110682264 | * | 1/2020 | ............... B25H 3/04 |
| CN | 110682264 A | | 1/2020 | |
| WO | 2020261312 A1 | | 12/2020 | |

OTHER PUBLICATIONS

International Search Report and Written Opinion for PCT Appl. No. PCT/IT2021/050185 mail date Sep. 13, 2021, 10 pages.
International Preliminary Report on Patentability for PCT Appl. No. PCT/IT2021/050185 mail date Dec. 29, 2022, 8 pages.

* cited by examiner

*Primary Examiner* — Lynn E Schwenning
(74) *Attorney, Agent, or Firm* — Maine Cernota & Curran

(57) ABSTRACT

Apparatus for collecting oblong products, preferably metal products, comprising a first containing device (11) mobile between a work position, in which it is able to receive a plurality of oblong products (P) from a working machine, and a delivery position, in which said metal products (P) are picked up. The present invention also concerns a method to collect said oblong products (P) and a plant (100) for working them.

15 Claims, 4 Drawing Sheets

APPARATUS AND METHOD FOR COLLECTING OBLONG PRODUCTS

RELATED APPLICATIONS

This application is a national phase application filed under 35 USC § 371 of PCT Application No. PCT/IT2021/050185 with an international filing date of Jun. 15, 2021, which claims priority of IT patent application Ser. No. 10/202, 0000014254 filed Jun. 16, 2020. Both of these applications are incorporated herein by reference in their entirety for all purposes.

FIELD OF THE INVENTION

Embodiments described here concern an apparatus and a method for collecting oblong products, preferably metal.

In particular, the present invention can be used to collect in an orderly and automated manner and in homogeneous groups, several oblong products having the same shape, or similar or comparable shape, to move them toward a manual or automated delivery and pick-up zone, to be then stored and/or transported for use.

By the term oblong products, here and hereafter in the text, we mean, in general, products made starting from elongated bars, possibly straightened, such as wire rod, reinforcement rods, round or square pieces, or suchlike, with a circular, polygonal or flat cross section shape. By way of example, the oblong products can be medium and large-sized stirrups, straightened bars, or shaped pieces with bends at one or both ends.

BACKGROUND OF THE INVENTION

Various cutting and bending machines are known, also called stirrup-making or shaping machines, to make stirrups and/or shaped pieces starting both from bundles of straight bars and also from coils of metal wire, for example made of steel.

Starting from the coils of metal wire, these machines can also straighten the wire before it is cut and bent. These machines can also make simple straightened bars.

In the context of the production of said metal products, there is the problem of their discharge at the end of working and their collection and movement for possible subsequent operations such as packaging, binding, storage and transport.

To facilitate their discharge, a stirrup-making/shaping machine normally has an inclined work surface so that the metal products, once the work cycle is finished, can simply fall without any need to use extraction devices or dedicated operators.

Below the work surface, an apparatus for collecting the metal products is usually installed, which usually comprises a container, for example a trolley, which is mobile so that it can be filled to its entire capacity with the products as they are gradually made by the machine.

The containing device, when full, moves to a delivery zone where the products are picked up in an automated or manual way, individually or in groups, and possibly bound.

One disadvantage of known apparatuses is that every time the containing device is full and moves toward the delivery zone, away from the machine, the machine itself must necessarily be stopped. This results in a waste of time and a decrease in productivity.

There is therefore a need to perfect an apparatus and method for collecting oblong products, preferably metal, which can overcome at least one of the disadvantages of the state of the art.

In particular, one purpose of the present invention is to provide an apparatus for collecting oblong products which allows the work machine to work continuously or almost continuously.

Another purpose of the present invention is to provide an apparatus for collecting oblong products which is simple and inexpensive, and guarantees great safety in the presence of dedicated operators, for example during the unloading step.

Another purpose is to perfect a method for collecting oblong products which allows to increase the overall productivity of the work plant and reduce production costs.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, an apparatus for collecting oblong products, preferably metal products, which overcomes the limits of the state of the art and eliminates the defects present therein, comprises a first containing device able to carry out a first movement between a work position, in which it is disposed in the proximity of a machine for working oblong products, and a delivery position, in which it is disposed away from the working machine as above and where the metal products are picked up or released.

According to one aspect of the present invention, the apparatus as above also comprises at least a second containing device which is also able to perform the first movement between the work and delivery positions as above, and vice versa. Furthermore, at least one of either the first containing device or the second containing device is suitable to also perform at least a second movement to assume a position of non-interference with the other.

Thanks to the fact that one of the two containing devices has a position of non-interference, the two containing devices can exchange their work and delivery positions substantially without a break in continuity, in the sense that there will always, or almost always, be a containing device associated with the working machine.

In accordance with some embodiments, there is provided a plant for working oblong products, preferably metal products, comprising a working machine and an apparatus for feeding the working machine. The plant also comprises the apparatus for collecting the oblong products as above.

In accordance with some embodiments, there is also provided a method to collect the oblong products as above which provides to move the first containing device between the work position and the delivery position. This method also provides to also move a second containing device between the work and delivery positions. Furthermore, during the movement between the work position and the delivery position and vice versa, at least one of either the first containing device or the second containing device is also moved vertically to assume at least a position of non-interference with the other.

The apparatus and method advantageously allow to operate continuously without stopping the working machine. This allows to increase the overall productivity of the plant and significantly reduce the number of machine stops after which there is often the need to rebalance some components.

BRIEF DESCRIPTION OF THE DRAWINGS

These and other aspects, characteristics and advantages of the present invention will become apparent from the following description of some embodiments, given as a non-restrictive example with reference to the attached drawings wherein.

Figure 1:
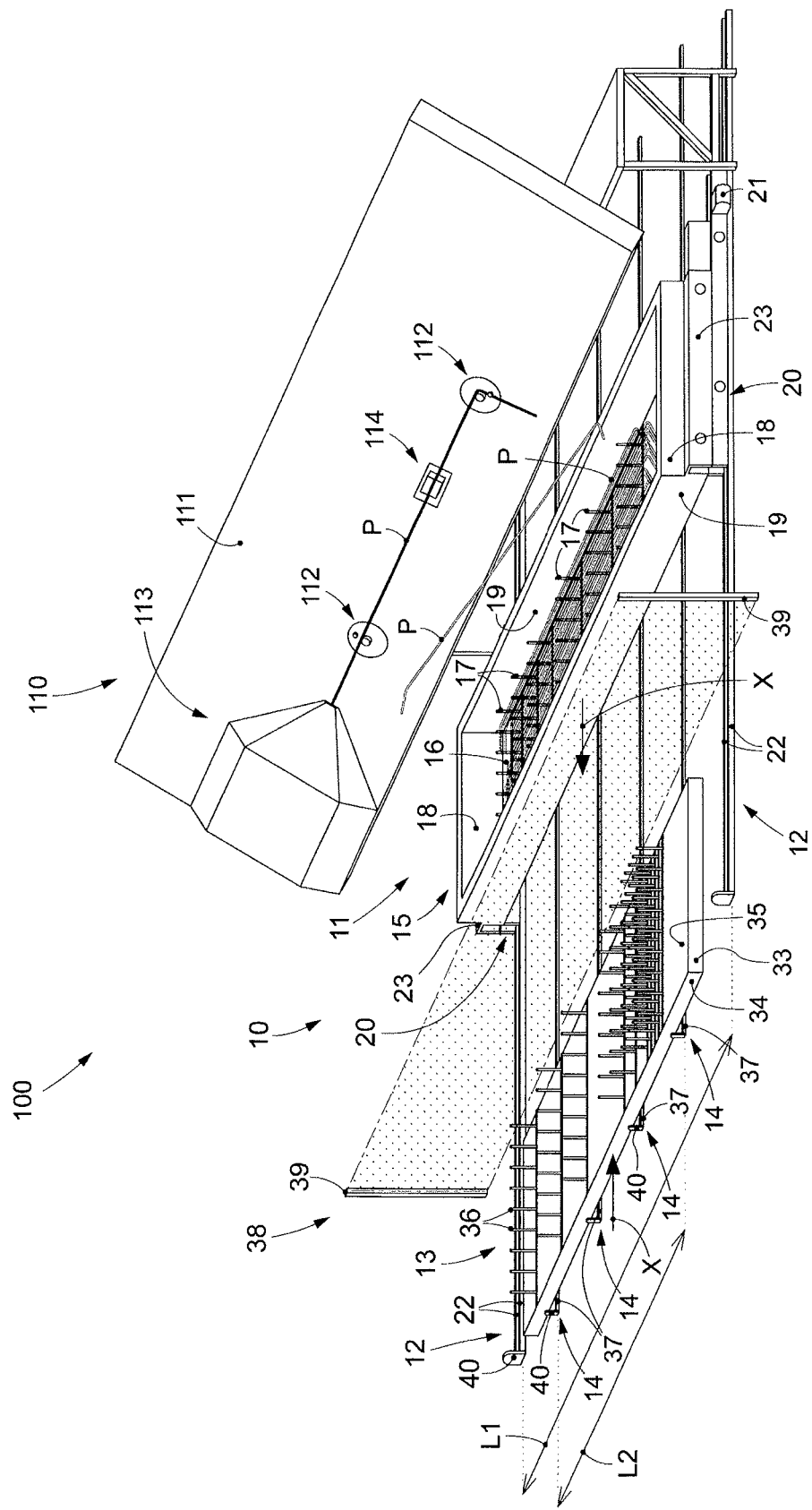
FIG. 1 is a perspective view that shows a plant for working oblong metal products in which there is an apparatus for collecting the oblong products as above in accordance with some embodiments described here.

To facilitate comprehension, the same reference numbers have been used, where possible, to identify identical common elements in the drawings. It is understood that elements and characteristics of one embodiment can conveniently be combined or incorporated into other embodiments without further clarifications.

DETAILED DESCRIPTION OF SOME EMBODIMENTS

We will now refer in detail to the possible embodiments of the invention, of which one or more non-limiting examples are shown in the attached drawings. The phraseology and terminology used here is also for the purposes of providing non-limiting examples.

Some embodiments described using the attached drawings concern an apparatus for collecting oblong products, preferably metal products, indicated as a whole with reference number 10 in the attached drawings.

The apparatus 10 comprises a first containing device 11 mobile between a work position, in which it is able to receive a plurality of metal products P from a working machine 110, and a delivery position, in which the oblong products P are picked up.

According to one aspect of the present invention, the apparatus 10 comprises a second containing device 13 also mobile between the delivery position and the work position. Furthermore, at least one of either the first containing device 11 or the second containing device 13 is mobile, in this specific case, also vertically to assume at least a position of non-interference with the other, and to allow the exchange of the reciprocal positions without necessarily requiring the stop of the working machine.

According to some embodiments described here, the first containing device 11 is mobile in an operating direction X on first movement guides 12 while the second containing device 13 is mobile in the operating direction X on second movement guides 14 more internal than the first movement guides 12, in the opposite direction to the first containing device 11, between the delivery position and the work position.

The first containing device 11 comprises a box 15 mobile also vertically so as to pass from a lowered condition, in which it is preferably found when it is in the work position or in the delivery position, to a raised condition when the first containing device 11 is moving from the work position to the delivery position and vice versa.

In particular, in the raised condition the box 15 is at a higher level than that of the second containing device 13 which can therefore slide under it.

This solution allows, by suitably coordinating the movement of the first containing device 11 and of the second containing device 13, to operate continuously without having to stop the machine 110 for working oblong products P.

Figure 2:
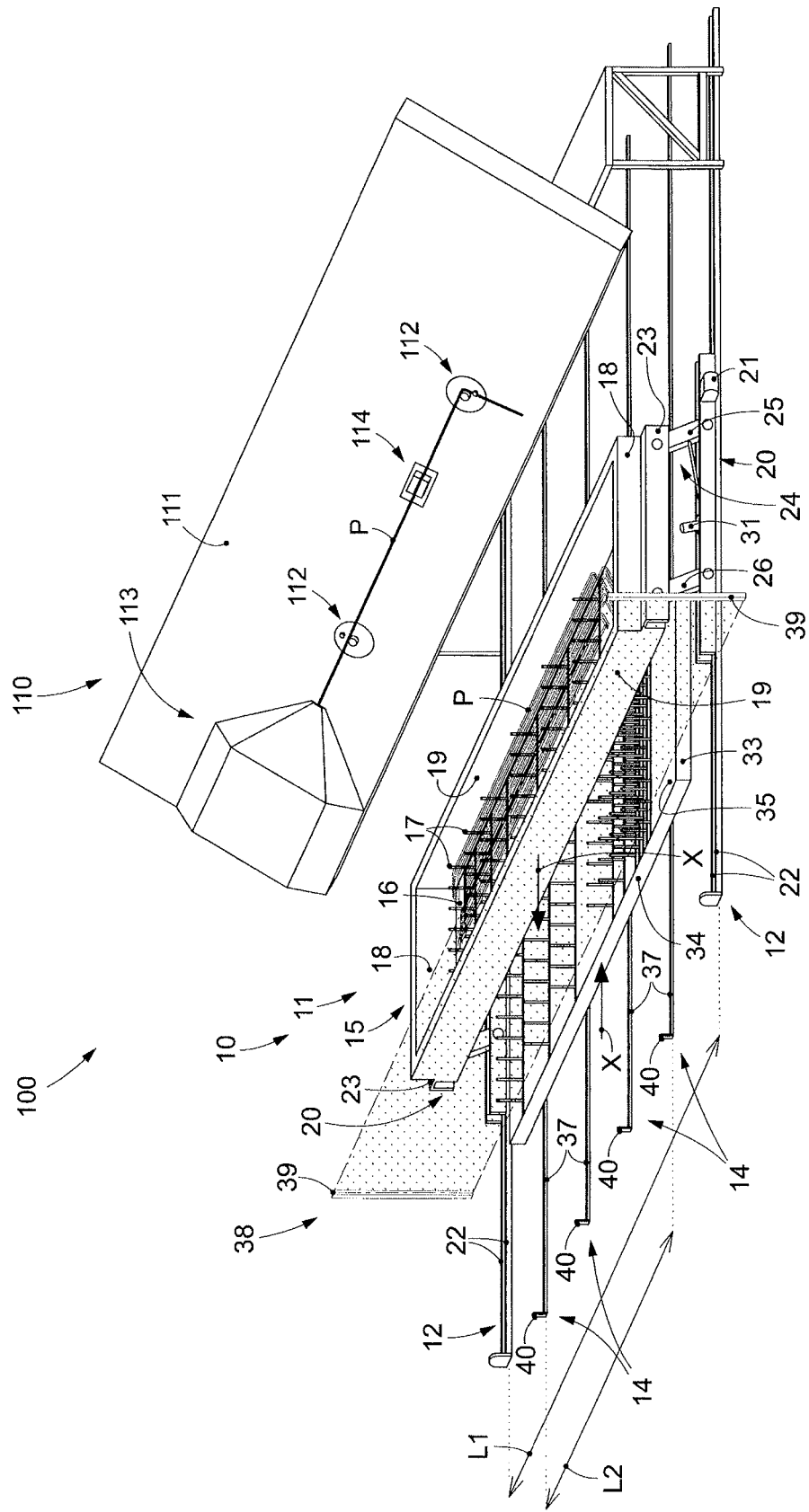
FIGS. 2-3 show the apparatus of FIG. 1 in different operating positions.
Figure 3:
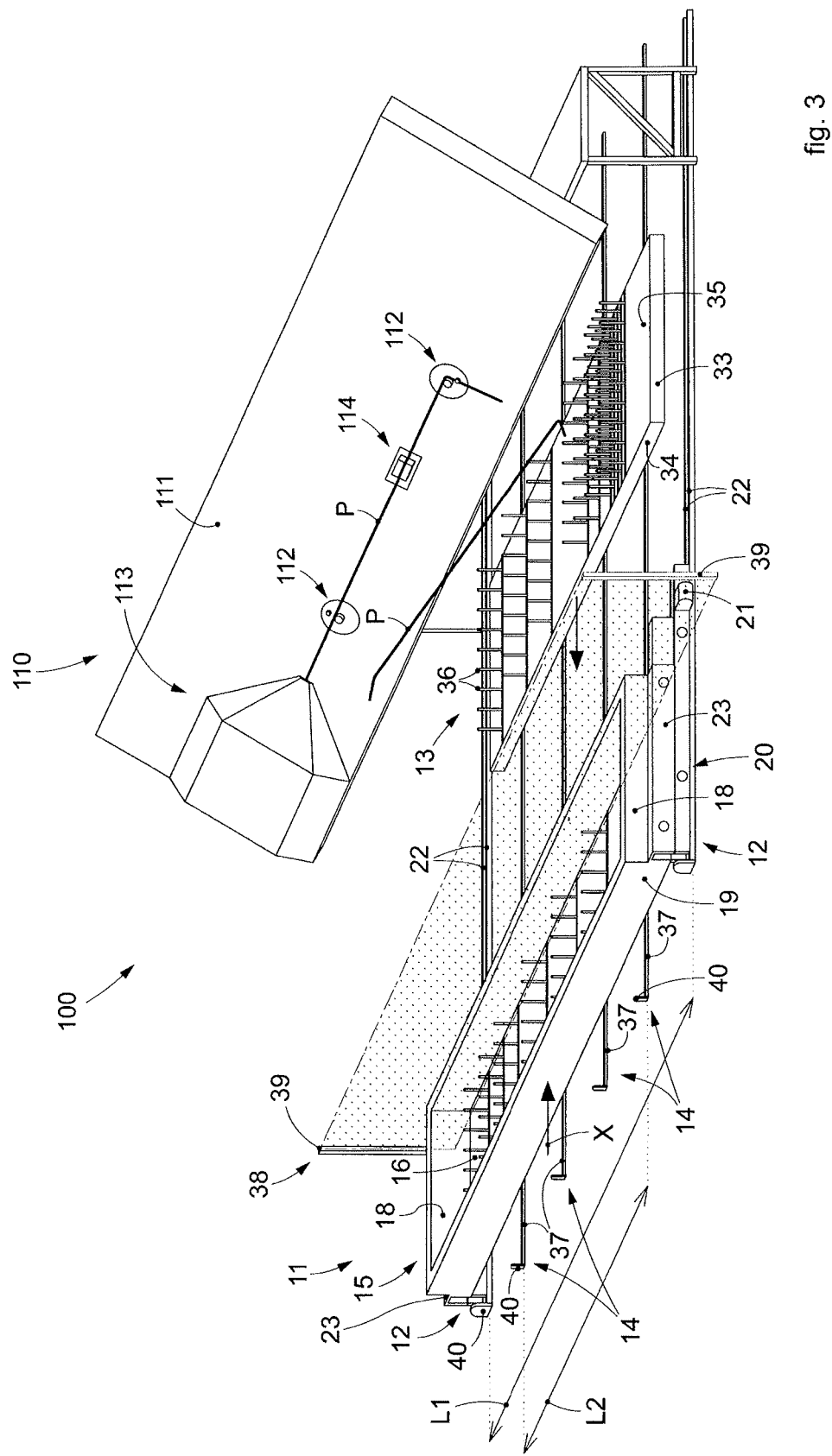

According to some embodiments, shown in FIGS. 1-3, the box 15 is delimited laterally by a pair of flanks 18, parallel and opposite each other, and by a respective pair of edges 19, parallel and opposite each other, and at the lower part by a bottom 16 on which the oblong products P are accumulated on each occasion. The flanks 18, the edges 19 and the bottom 16 define a containing space open upward and substantially having a parallelepiped shape. In particular, the flanks 18 are parallel to the operating direction X while the edges 19 are transverse with respect to the operating direction X, in this specific case substantially orthogonal to it. Advantageously, the presence of the edges 19 and the flanks 18 prevents the oblong products P from falling, especially when the box 15 is raised or lowered.

According to some embodiments, the box 15 is provided with a pair of support portions 23, wherein each support portion 23 is attached cantilevered to a respective one of the flanks 18, outside the containing space. The distance between the support portions 23 substantially defines the overall transverse size of the box 15.

The support portions 23 can be made in a single body with the flanks 18 or can be attached to them. In the example described here, the support portion 23 has an inverted U shaped profile, facing toward the first movement guide 12 below.

The box 15 can comprise ordering elements 17 which project vertically from the bottom 16 and partition the containing space. For example, these ordering elements 17 can be disposed in a checkerboard pattern, according to a homogeneous or non-homogeneous configuration, in order to define a plurality of sectors inside which the oblong products P can accumulate, thus preventing their scattering. The sectors thus defined can be useful for collecting oblong products P having different shapes and lengths to order them into homogeneous groups.

The first containing device 11 also comprises slider-mounted support means 20, at the upper part of which there is attached the box 15 in correspondence with the support portions 23. The support means 20 slide on the first movement guides 12 to move the first containing device 11 in the operating direction X.

Figure 4:
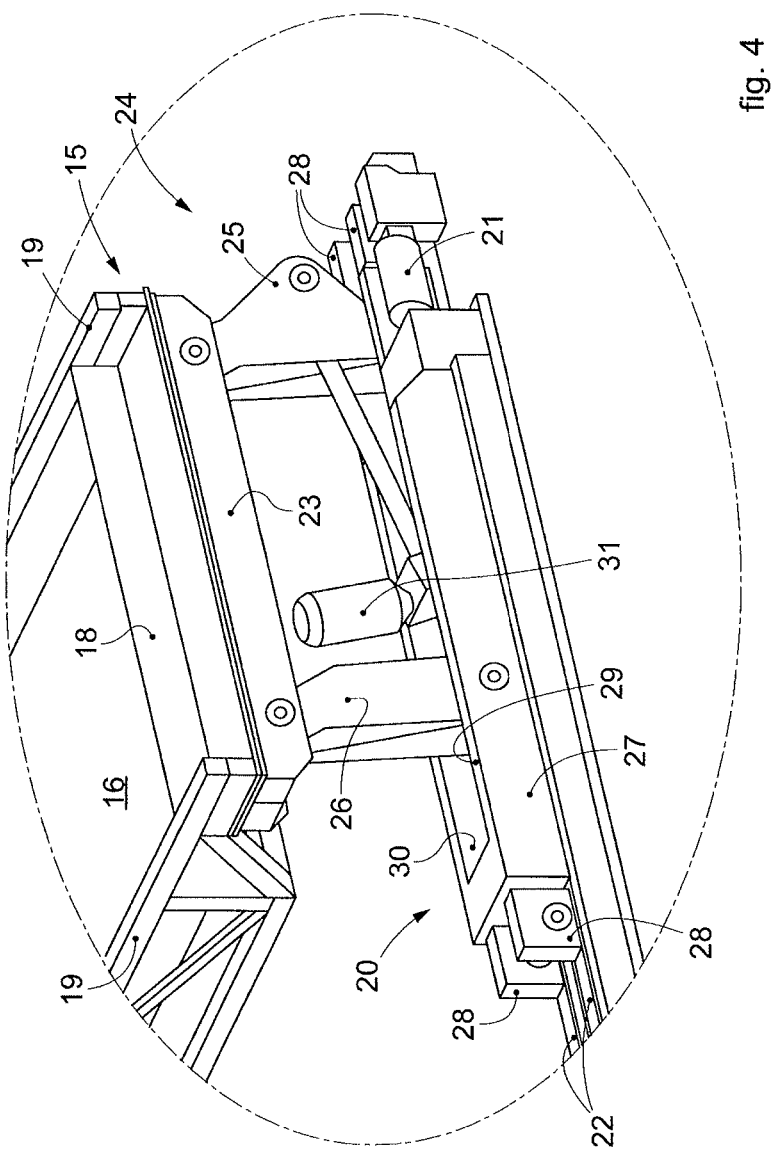
FIG. 4 is an enlarged detail of FIG. 2.

Based on the drawing in FIG. 4, each support mean 20 comprises a support body 27 with which there are associated wheels 28, at the front and rear, able to slide on the first movement guides 12. The support body 27 has a prevalent extension, or length, in the direction of the movement guide 12 and has an upper surface 29 on which the support portion 23 can rest, for example when the box 15 is in the lowered condition. The support body 27 preferably has a length equal to, or even better, greater than, the distance between the edges 19 so as to guarantee stability during movement.

According to some embodiments, with the support means 20 there is associated a respective drive device 21 which can be selectively activated to regulate their movement and speed of advance.

As shown in FIGS. 1-3, the first movement guides 12 comprise at least two rails 22 transversely distanced from each other, in particular in a direction orthogonal to the operating direction X, by a distance L1 which, in this specific case, is approximately equal to the length of the edges 19 in the same direction. The two rails 22 are coplanar and delimit, on two sides, a sliding corridor inside which both the first containing device 11 and also the second containing device 13 slide.

Preferably, the first containing device 11 slides on two pairs of rails 22. A respective support mean 20 is associated with each pair of rails 22. The two pairs of rails 22 are transversely distanced from each other by the distance L1, while the rails 22 of the same pair are brought closer together, for example at a distance equal to the width of the support body 27, FIG. 4. Advantageously, the sliding on pairs of rails 22 allows a more precise and stable movement.

According to some embodiments, shown in FIG. 2 and FIG. 4, the first containing device 11 also comprises lifting means 24 disposed between the respective support mean 20 and the box 15, and able to take the latter from the lowered condition to the raised condition and vice versa.

According to some embodiments, shown in FIG. 4, the lifting means 24 can be pivoted at the lower part to the support means 20, in particular to the support body 27, and at the upper part to the box 15, in particular to the support portions 23, preferably in correspondence with the ends closest to the edges 19.

Each lifting mean 24 comprises a pair of levers 25, 26 in which a first lever 25 is motorized while a second lever 26 is idle. The first lever 25 is associated with a drive device 31 of the cylinder-piston type which allows its rotation, FIG. 4.

The first lever 25 and the second lever 26 can be partly recessed in a seating 30 of the support body 27. In this way, when they rotate, taking the box 15 from the raised condition to the lowered condition, the levers 25, 26 lie almost completely inside the seating 30 and the support portions 23 can therefore rest on the upper surface 29 of the seating 30, FIG. 1 and FIG. 3.

According to possible embodiments, the lifting of the box 15 can also be carried out in other ways. For example, as an alternative to the lever mechanism, it is possible to provide one or more hydraulic or pneumatic jacks that allow the box 15 to be lifted vertically.

The second containing device 13, with particular reference to FIGS. 1-3, comprises a collection plane 32 able to slide along the second movement guides 14. The second movement guides 14 comprise at least two rails 37 parallel to the operating direction X and to the rails 22. The rails 37 are also coplanar to the rails 22 and lie inside the sliding corridor as above.

According to some embodiments, the collection plane 32 is, in particular, able to slide on four equidistant rails 37 attached slidingly under the collection plane 32. The outermost rails 37 are distanced by a distance L2 shorter than the distance L1.

Furthermore, according to some embodiments, the collection plane 32 is delimited laterally by a pair of lateral walls 33, parallel and opposite each other, and by a pair of head walls 34, which are also parallel and opposite each other, and at the upper part by a collection base 35 on which the oblong products P are accumulated on each occasion. The distance between the lateral walls 33 substantially defines the overall transverse size of the collection plane 32. In particular, the lateral walls 33 are parallel to the operating direction X while the head walls 34 are transverse with respect to the operating direction X, in this specific case substantially orthogonal to it. It goes without saying that the lateral walls 33 are parallel to the flanks 18 while the head walls 34 are parallel to the edges 19.

According to possible embodiments, the collection plane 32 can be provided with lateral containing elements, such as walls, edges or flanks, able to define a physically delimited containing volume so as to prevent the oblong products P from falling during the movement of the collection plane 32, or also when the oblong products P are collected on the collection base 35.

According to some embodiments, the overall transverse size of the collection plane 32 is smaller than the overall transverse size of the box 15. This is necessary to allow the collection plane 32 to pass under the box 15 when passing from the work position to the delivery position without causing reciprocal interferences.

According to some embodiments and similarly to what is provided for the box 15, the collection plane 32 can comprise ordering elements 36 which project vertically from the collection base 35, partitioning it to define a plurality of containing zones inside which the oblong products P with even different shapes and lengths can accumulate, thus preventing their scattering.

According to some embodiments, the rails 22, 37 are longitudinally delimited by end-of-travel elements 40 which can act as a brake-shock absorber and can integrate position sensors to determine the position of the containing devices 11, 13.

According to some embodiments, the apparatus 10 comprises, in an intermediate position between the work position and the delivery position, a sensor 38, of the optical or laser type, able to detect the passage of the containing devices 11, 13. The sensor 38 comprises two receiving-transmitting towers 39 disposed at the sides of the rails 22 outside the sliding corridor. The towers 39 have a height approximately equal to, preferably greater than, the height at which the box 15 is located in the raised condition. In this way, it is possible to control the reciprocal vertical position between the box 15 and the collection surface 32.

Some embodiments described in FIGS. 1-3 also concern a plant 100 for working oblong products P, preferably metal products, comprising a working machine 110, an apparatus for feeding the oblong products P to the working machine 110 and the collection apparatus 10.

According to possible embodiments, the working machine 110 can be selected from a group comprising a cutting and shaping machine, a bending and shaping machine, a machine for cutting to size or other.

With particular reference to the example described here, the working machine 110 is a bending and shaping machine comprising a work plane 111 on which two bending units 112 are installed, able to define the specific bends that the oblong product P has to have. On the work plane 111 there is also a drawing unit 113 able to feed on each occasion one or more oblong products P to the bending units 112. Between the bending units 112 there is a clamp-type holding element 114, possibly mobile and able to support and hold the oblong product P during the workings. The work plane 111 is inclined downward so that the oblong products P made on each occasion can fall by gravity and be collected by the collection apparatus 10.

In accordance with some embodiments, there is provided a method to collect oblong products P, preferably metal products. The method provides to move the first containing device 11 between the work position, in which it is able to receive a plurality of oblong products P from the working machine, and a delivery position, in which the metal products P are picked up.

According to one aspect of the present invention, the method also provides to move also a second containing device 13 between the delivery position and the work position. Furthermore, at least one of either the first containing device 11 or the second containing device 13 is also moved vertically to assume a position of non-interference with the other.

Operationally and cyclically, the method provides a first filling step, in which the first containing device 11 is moved to a work position in which it remains in order to receive a first plurality of metal products P from the working machine, FIG. 1.

Once the first containing device 11 has been filled, the method provides a first delivery step, in which the first containing device 11 is moved toward the delivery position in which it remains in order to allow the first plurality of metal products P to be picked up, FIG. 2. Simultaneously with the first delivery step, the method provides a second filling step in which the second containing device 13 is moved toward the work position in which it remains in order to receive a second plurality of metal products P from the working machine, FIG. 3.

Always referring to FIG. 2, during this movement, while the first containing device 11 and the second containing device 13 slide toward each other, the box 15 is raised vertically so as to surmount the collection plane 32.

Finally, the method provides a second delivery step, simultaneous with the first filling step, in which the second containing device 13 is moved toward the delivery position in which it remains in order to allow the second plurality of metal products P to be picked up.

In this way, it is possible to make and collect the oblong products P continuously, without having to interrupt the working machine and without creating collection "lungs".

It is clear that modifications and/or additions of parts or steps may be made to the apparatus and method for collecting oblong products, preferably metal products, as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

What is claimed is:

1. An apparatus for collecting oblong products comprising:
   a first containing device configured for carrying out a first movement between a work position, in which the first containing device is disposed in the proximity of a working machine that is configured to discharge said oblong products, and a delivery position, in which the first containing device is disposed away from said working machine: and
   a second containing device that is also able to carry out said first movement between said delivery position and said work position;
   wherein said first containing device comprises a box attached on top of slider-mounted supports and configured to slide horizontally on first movement guides along an operating axis, said first containing device being further configured to be vertically moved by lifting mechanisms disposed between said supports and said box so as to pass from a lowered condition to a raised condition and vice versa, said box in said raised condition being at a higher level than said second containing device, and being thereby in a position of non-interference with the second containing device.

2. The apparatus of claim 1, wherein:
   said second containing device is mobile along said operating axis on second movement guides that are located between said first movement guides, said first and second containing devices being configured to simultaneously move in opposite directions along said operating axis.

3. The apparatus of claim 2, wherein:
   said second containing device comprises a collection plane that is able to slide along said second movement guides; and
   an overall transverse size of said collection plane is smaller than an overall transverse size of said box.

4. The apparatus of claim 3, wherein said box and said collection plane comprise respective ordering elements projecting vertically respectively from a bottom of said box and from a collection base of said collection plane, said ordering elements being able to define a plurality of sectors for containing said oblong products.

5. The apparatus of claim 1, wherein:
   each of the lifting mechanisms comprises a pair of levers of which a first of the levers is motorized while a second of the levers is not motorized; and
   said levers are pivoted at lower parts thereof to said supports and at upper parts thereof to said box.

6. The apparatus of claim 1, further comprising, in an intermediate position between said work position and said delivery position, a sensor that is able to detect at least one of a passage of said containing devices and a vertical position of said first containing device.

7. A plant for working oblong products, comprising a working machine configured to discharge said oblong products and an apparatus for feeding said working machine, characterized in that the apparatus for feeding said working machine comprises an apparatus for collecting said oblong products as in claim 1.

8. The plant of claim 7, wherein said working machine is selected from a group comprising a machine for cutting and shaping said oblong products, a machine for bending and shaping said oblong products, and a machine for cutting to size said oblong products.

9. A method of collecting oblong products comprising:
   providing an apparatus according to claim 1;
   moving the first containing device to the work position;
   receiving by the first containing device a plurality of oblong products from a working machine that is configured to discharge said oblong products;
   moving the first containing device to the delivery position; and
   releasing the plurality of oblong products by the first containing device;
   wherein the second containing device moves between said delivery position and said work position concurrently with and in an opposite direction to said moving of said first containing device; and
   wherein during the movements of the first and second containing devices between said work position and said delivery position, at least one of said containing devices is also moved in a direction such as to assume at least a position of non-interference with the other of the containing devices.

10. The method of claim 9, wherein the oblong products are metal products.

11. The method of claim 9, wherein said second containing device is mobile along said operating axis on second movement guides that are located between said first movement guides, said first and second containing devices being configured to simultaneously move in opposite directions along said operating axis.

12. The method of claim 11, wherein:
said second containing device comprises a collection plane that is able to slide along said second movement guides; and
an overall transverse size of said collection plane is smaller than an overall transverse size of said box.

13. The method of claim 12, wherein said box and said collection plane comprise respective ordering elements projecting vertically respectively from a bottom of said box and from a collection base of said collection plane, said ordering elements being able to define a plurality of sectors for containing said oblong products.

14. The method of claim 9, wherein:
each of the lifting mechanisms comprises a pair of levers of which a first of the levers is motorized while a second of the levers is not motorized; and
said levers are pivoted at lower parts thereof to said supports and at upper parts thereof to said box.

15. The method of claim 9, further comprising, in an intermediate position between said work position and said delivery position, a sensor that is able to detect at least one of a passage of said containing devices and a vertical position of said first containing device.

\* \* \* \* \*